(12) United States Patent
Stevens et al.

(10) Patent No.: US 10,805,322 B2
(45) Date of Patent: Oct. 13, 2020

(54) PACKET CAPTURE AND NETWORK TRAFFIC REPLAY

(71) Applicant: Verizon Patent and Licensing Inc., Basking Ridge, NJ (US)

(72) Inventors: Gene Stevens, Lakeood, CO (US); Scott Chasin, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/282,959

(22) Filed: Feb. 22, 2019

(65) Prior Publication Data
US 2019/0312891 A1    Oct. 10, 2019

Related U.S. Application Data

(63) Continuation of application No. 15/334,727, filed on Oct. 26, 2016, now abandoned, which is a continuation of application No. 14/079,400, filed on Nov. 13, 2013, now Pat. No. 9,516,049.

(51) Int. Cl.
*H04L 29/06* (2006.01)
(52) U.S. Cl.
CPC ...... *H04L 63/1416* (2013.01); *H04L 63/1425* (2013.01)
(58) Field of Classification Search
CPC .......... H04L 63/1416; H04L 63/1425
See application file for complete search history.

(56) References Cited

U.S. PATENT DOCUMENTS

| | | |
|---|---|---|
| 5,315,580 A | 5/1994 | Phaal |
| 5,935,245 A | 8/1999 | Sherer |
| 6,453,345 B2 | 9/2002 | Trcka et al. |
| 6,735,688 B1 | 5/2004 | Upton et al. |
| 7,006,756 B1 | 2/2006 | Keesen et al. |
| 7,181,769 B1 | 2/2007 | Keanini et al. |
| 7,251,215 B1 | 7/2007 | Turner et al. |
| 7,254,114 B1 | 8/2007 | Turner et al. |
| 7,307,949 B1 | 12/2007 | Washburn |
| 7,379,857 B2 | 5/2008 | Piesco |
| 7,454,790 B2 | 11/2008 | Potok |
| 7,472,418 B1 | 12/2008 | McCorkendale |
| 7,492,713 B1 | 2/2009 | Turner et al. |
| 7,519,990 B1 | 4/2009 | Xie |
| 7,581,249 B2 | 8/2009 | Bussiere et al. |

(Continued)

OTHER PUBLICATIONS

Application Aware Network Performance Monitoring Essentials; Network Instruments Techology Partner/Solution Brief; available at http://www.gigamon.com/PDF/TechnologySolutionBriefs/NetworkInstruments_Solution/Brief.pdf. 3 pages. Copyright 2012.

(Continued)

*Primary Examiner* — Abu S Sholeman

(57) ABSTRACT

Implementations disclosed herein provide a network agent embodied in firmware and/or software that replays network traffic of an enterprise network to an entity outside of the enterprise network. The network agent selects and processes the network traffic according to certain policies set by the enterprise network or a third party security management system. These policies allow for a capture and replay of high-integrity data that enables threat analysis.

24 Claims, 5 Drawing Sheets

(56) References Cited

U.S. PATENT DOCUMENTS

| | | |
|---|---|---|
| 7,587,485 B1 | 9/2009 | Chitnis et al. |
| 7,650,533 B1 | 1/2010 | Saxena et al. |
| 7,835,348 B2 | 11/2010 | Kasralikar |
| 7,877,807 B2 | 1/2011 | Shipp |
| 7,899,901 B1 | 3/2011 | Nijemanze et al. |
| 8,046,835 B2 | 10/2011 | Herz |
| 8,248,958 B1 | 8/2012 | Tulasi |
| 8,260,716 B2 | 9/2012 | Hoffman et al. |
| 8,499,330 B1 | 7/2013 | Albisu et al. |
| 8,560,679 B2 | 10/2013 | Nijemanze et al. |
| 8,577,355 B1 | 11/2013 | Shaw |
| 8,621,636 B2 | 12/2013 | Bailey |
| 8,898,788 B1 | 11/2014 | Aziz et al. |
| 9,026,722 B2 | 5/2015 | Kamphenkel et al. |
| 9,183,384 B1 | 11/2015 | Bruhmuller |
| 9,204,299 B2 | 12/2015 | McCann et al. |
| 9,497,211 B2 | 11/2016 | Spatscheck et al. |
| 10,559,181 B2 * | 2/2020 | Pourmohammad .... G08B 31/00 |
| 10,565,844 B2 * | 2/2020 | Pourmohammad ......................... G06Q 10/0635 |
| 2001/0039579 A1 | 11/2001 | Trcka et al. |
| 2002/0163913 A1 | 11/2002 | Oh |
| 2003/0074317 A1 | 4/2003 | Hofi |
| 2003/0145039 A1 | 7/2003 | Bonney et al. |
| 2004/0172557 A1 * | 9/2004 | Nakae ................. H04L 63/0227 726/22 |
| 2004/0264454 A1 | 12/2004 | Rajkumar et al. |
| 2005/0166041 A1 | 7/2005 | Brown |
| 2005/0193244 A1 | 9/2005 | Stager et al. |
| 2006/0143300 A1 | 6/2006 | See et al. |
| 2006/0161983 A1 | 7/2006 | Cothrell |
| 2006/0259542 A1 * | 11/2006 | Wu ......................... H04L 43/12 709/202 |
| 2006/0265748 A1 | 11/2006 | Potok |
| 2007/0060169 A1 | 3/2007 | Johansson et al. |
| 2007/0074272 A1 | 3/2007 | Watanabe |
| 2007/0088922 A1 | 4/2007 | Passerini |
| 2007/0204346 A1 | 8/2007 | Meier |
| 2007/0289014 A1 | 12/2007 | Pyo et al. |
| 2008/0005782 A1 | 1/2008 | Aziz |
| 2008/0080540 A1 | 4/2008 | Karacali-Akyamac et al. |
| 2008/0127335 A1 | 5/2008 | Khan et al. |
| 2008/0163333 A1 | 7/2008 | Kasralikar |
| 2008/0172738 A1 * | 7/2008 | Bates ..................... G06F 21/64 726/22 |
| 2008/0196102 A1 | 8/2008 | Roesch |
| 2008/0260151 A1 | 10/2008 | Fluhrer et al. |
| 2009/0044024 A1 | 2/2009 | Oberheide |
| 2009/0172818 A1 | 7/2009 | Sutherland et al. |
| 2009/0213861 A1 | 8/2009 | Benner et al. |
| 2009/0282125 A1 | 11/2009 | Jeide et al. |
| 2010/0122345 A1 | 5/2010 | Wu et al. |
| 2010/0180004 A1 | 7/2010 | Oliynyk et al. |
| 2010/0265915 A1 | 10/2010 | Sun et al. |
| 2010/0296395 A1 * | 11/2010 | Fukuda ................... H04L 47/10 370/230 |
| 2011/0055916 A1 | 3/2011 | Ahn |
| 2011/0154497 A1 | 6/2011 | Bailey |
| 2011/0179479 A1 | 7/2011 | Tsai et al. |
| 2011/0246798 A1 | 10/2011 | Bilgin |
| 2011/0306386 A1 | 12/2011 | Centoza |
| 2011/0307956 A1 | 12/2011 | Yermakov et al. |
| 2012/0005754 A1 | 1/2012 | Lin et al. |
| 2012/0060209 A1 | 3/2012 | Leu |
| 2012/0159591 A1 | 6/2012 | Payne et al. |
| 2012/0166637 A1 | 6/2012 | White et al. |
| 2012/0291125 A1 | 11/2012 | Maria |
| 2013/0081137 A1 | 3/2013 | Geigel |
| 2013/0086615 A1 | 4/2013 | Williams |
| 2013/0094355 A1 | 4/2013 | Nakash |
| 2013/0094515 A1 | 4/2013 | Gura et al. |
| 2013/0138875 A1 | 5/2013 | Kamphenkel et al. |
| 2013/0227689 A1 | 8/2013 | Pietrowicz et al. |
| 2013/0301607 A1 | 11/2013 | McCann et al. |
| 2014/0059678 A1 | 2/2014 | Parker |
| 2014/0130167 A1 | 5/2014 | Lee et al. |
| 2014/0153399 A1 | 6/2014 | Song |
| 2014/0223559 A1 | 8/2014 | Spatscheck et al. |
| 2014/0325649 A1 | 10/2014 | Zhang |
| 2015/0007314 A1 | 1/2015 | Vaughan |
| 2015/0067816 A1 * | 3/2015 | Rados ..................... H04L 63/20 726/11 |
| 2015/0135301 A1 | 5/2015 | Davies et al. |
| 2015/0236819 A1 | 8/2015 | Zhovnirnovsky et al. |
| 2016/0277578 A1 | 9/2016 | Williams et al. |
| 2017/0048262 A1 * | 2/2017 | Stevens ............... H04L 63/1416 |

OTHER PUBLICATIONS

What is a Network Packet Broker? VSS; http://vsssmonitoring.com/home/network-packet-broker.asp, 4 pages. Copyright 2014. Retrieved Sep. 30, 2014.

Prevail Security Analytics—Disruptive Approach for Finding and Analyzing Advanced Attacks; http://www.arbornetworks.com/products/prevail/security/analytics, 3 pages. Copyright 2015. Retrieved May 13, 2015.

* cited by examiner

PACKET CAPTURE AND NETWORK TRAFFIC REPLAY

CROSS-REFERENCE TO RELATED APPLICATIONS

This application is a continuation of application Ser. No. 15/334,727, entitled "Packet Capture and Network Traffic Replay," filed Oct. 26, 2016, which is a continuation of application Ser. No. 14/079,400, entitled "Packet Capture and Network Traffic Replay," filed Nov. 13, 2013, and issued as U.S. Pat. No. 9,516,049, the disclosures of which are hereby incorporated herein by reference in their entirety.

BACKGROUND

"Packet capture" is a process of intercepting and logging network traffic. Technologies that collect, monitor, and/or analyze network traffic can be useful in searching for and identifying cyber security threats. However, the threat detection capability of network security systems can be dependent upon data fidelity and the total amount of data (e.g., network traffic) that is available for analysis.

When a cyber attack occurs, a subsequent identification of compromised data (e.g., accounts, passwords, etc.) can involve a thorough analysis of network traffic surrounding the attack. However, some systems may not be capable of storing enough network traffic to permit such a thorough analysis. In addition, a security breach may not be discovered until days or months after the cyber attack actually occurs. By this time, network traffic recorded near the time of the cyber attack is, in some systems, no longer available for analysis.

Additionally, some systems selectively discard certain types of traffic to conserve storage space. This discarded traffic may contain threat signatures that can provide important network security information. Selective recording and discarding of information creates an incomplete record of what actually happened, leaving significant guesswork to security analysis experts.

SUMMARY

Implementations described and claimed herein address the foregoing by providing a security system including a network agent that replays network traffic of an enterprise network outside of the enterprise network. The network agent selects and processes the network traffic according to certain policies set by the enterprise network or a third party security management system. Network agents of multiple different enterprise networks may work in concert with the security management system and each other to provide threat analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

Figure 5:
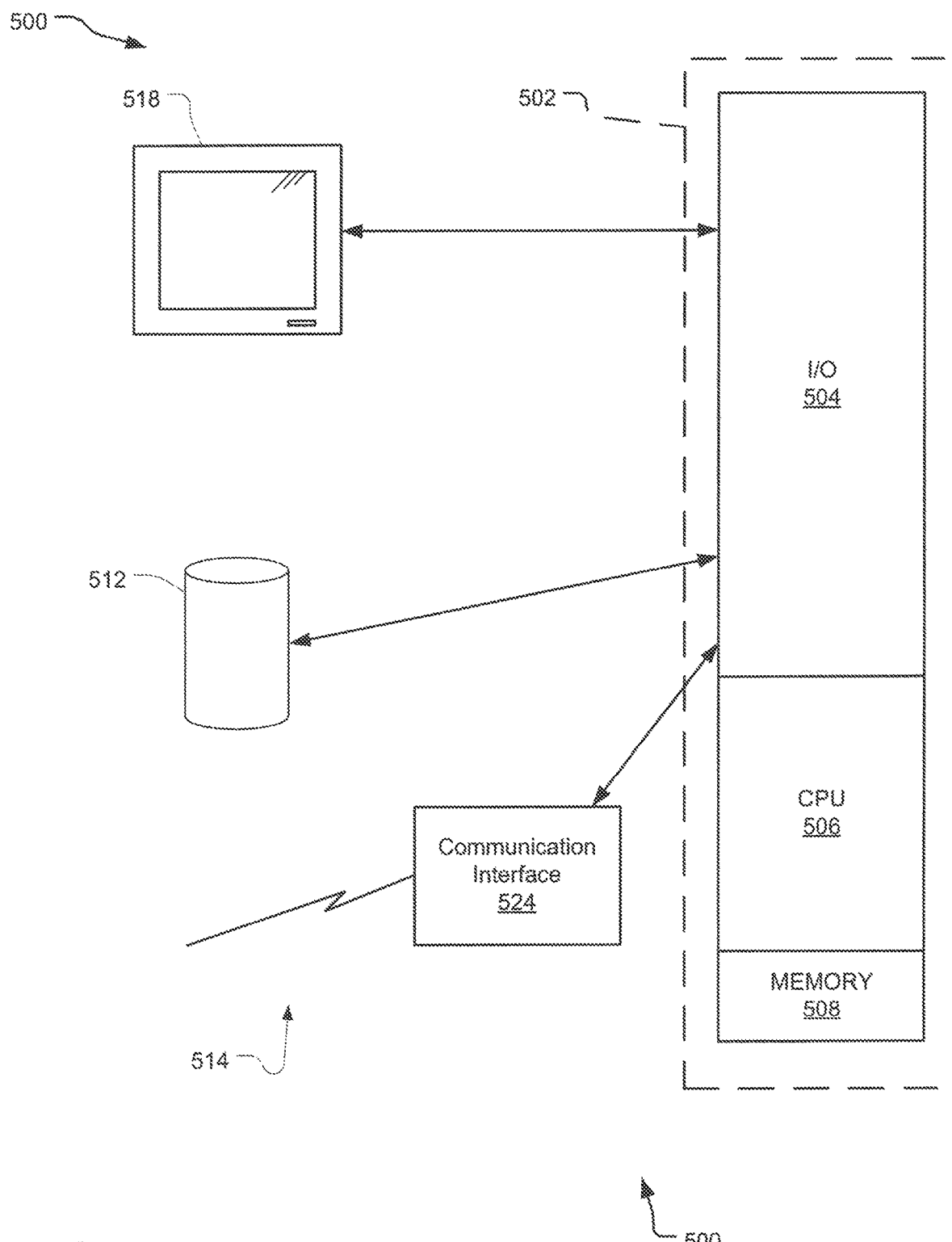

FIG. 5 discloses a block diagram of a computer system suitable for implementing one or more aspects of a security system that provides for network traffic replay outside of an enterprise network.

DETAILED DESCRIPTION

Figure 1:
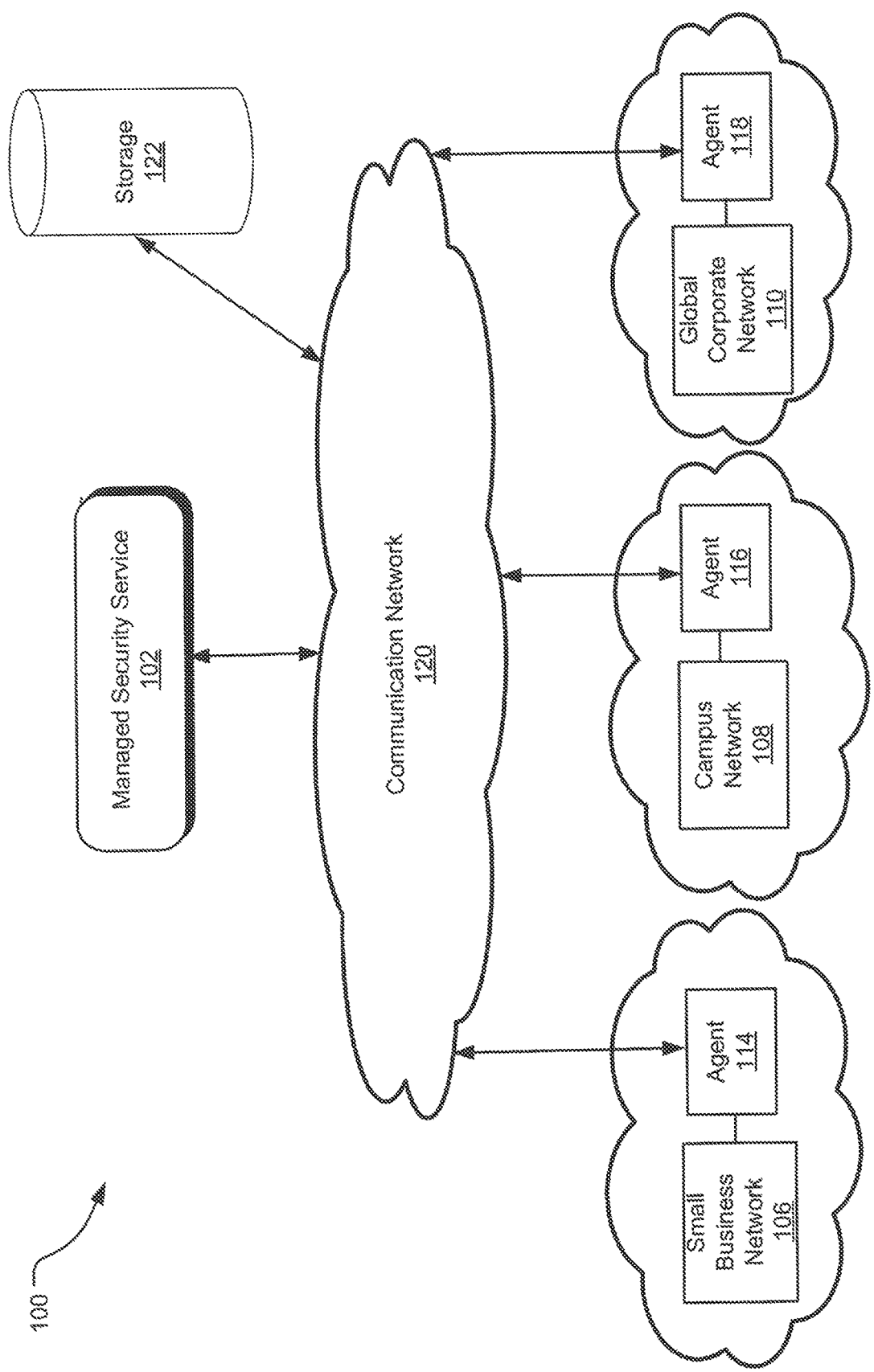
FIG. 1 illustrates an example network security system that replays traffic to provide threat analysis.

FIG. 1 illustrates an example security system 100 that replays network traffic to provide threat analysis. The network security system 100 includes a number of different enterprise networks 106, 108, and 110 coupled to a managed security service 102 across a communication network 120. The term "enterprise network" is used herein to refer to a network built by an enterprise to interconnect one or more enterprise sites and devices in order to share technology resources stored in one or more different physical locations. The sites and devices within the enterprise network are controlled by the security policies of the enterprise. An enterprise network can be a private or public network, and may include data hosted by one or more different servers. "Network traffic" refers to, for example, data traveling into, out of, or within an enterprise network.

The security system 100 includes a number of example enterprise networks including a small business network 106, a campus network 108, and a global corporate network 110. Other implementations of the disclosed technology include a plurality of other types of enterprise networks similar to or different from those shown in FIG. 1.

The small business network 106 includes a plurality of devices (e.g., desktop computers, laptop computer, tablets, mobile phones, etc.) with shared access to sensitive data such as customer contact information, sales records, inventory, etc. The computers may be located in the same facility (e.g., a store) or distributed across multiple facilities.

The example global corporate network 110 differs from the small business network 106 in that it has multiple branches around the world that exchange information over the same enterprise network. In one implementation, the example global network 110 shares information between the branches using a Virtual Private Network (VPN), which allows employees in different offices and/or other remote locations to access corporate resources (e.g., resources of a head office) in a secure and efficient manner.

The example campus network 108 connects students, faculty, and campus staff to shared data. In one implementation, the students, faculty, and staff connect to the campus network 108 by logging into a personal account with a username and password.

Each of the example enterprise networks 106, 108, and 110 has at least one local network agent (e.g., network agents 114, 116 and 118), which may be firmware and/or software residing within devices of each associated enterprise network, such as one or more computers or network appliances (e.g., mobile phones, tablets etc.). Each of the network agents 114, 116, and 118 are communicatively coupled, such as through the communication network 120 (e.g., the internet), to the managed security service 102. It should be understood that the above-described features of the small business network 106, campus network 108, and global corporate network 110 are exemplary features that in no way limit the scope of the term "enterprise network."

The network agents 114, 116, and 118 each selectively monitor local network traffic and replay the network traffic outside of the enterprise network (e.g., into the communication network 120). As used herein, the phrase "outside of the enterprise network" refers to a location outside of the security net of the controlling enterprise. "Replay" of network traffic entails intercepting network traffic destined for a target within or outside of the enterprise network; copying the intercepted network traffic; and transmitting the copied network traffic to a destination other than the target destination. The original, intercepted network traffic arrives at the target destination substantially unaffected by the replay.

The network agents 114, 116, and 118 each operate according to policies that control the amount and type of network traffic that is replayed into the communication network 120 from each of the enterprise networks. For example, various policies may govern which network traffic is selected and how the selected network traffic is processed during replay. The policies of one network agent (e.g., the network agent 114) may be the same or different from the policies of another network agent (e.g., the network agent 116). The policies of each of the network agents can be set by a controlling entity of the associated enterprise network or by a controlling entity associated with the managed security service 102. For example, policies may be specified by a system administrator or software parameters that are pre-selected or adaptively changed.

The security system 100 allows for a large or potentially infinite amount of data to be stored in storage 122 communicatively coupled to the communication network 120. Therefore, data storage constraints of the security system 100 may be considerably less burdensome than those constraints imposed when network traffic data is stored on hardware internal to a single enterprise network. In one implementation, the quantity of network traffic replayed into the communication network 120 by each of the network agents 114, 116, and 118 depends on the terms of a subscription plan between the managed security service 102 and each of the associated enterprise networks. For example, the global corporate network 110 may subscribe to a security service that provides for replay of a greater quantity of network traffic than a quantity of network traffic that is replayed from the small business network 106.

In one implementation, the replay of network traffic into the communication network 120 is performed in real-time. As used herein, "real-time" replay of network traffic entails transmission of select data (e.g., a copy of a subset of all data received) at substantially the same rate as the select data is received. In one implementation, "real-time" replay entails an average of one or more individual transmissions per second. A single transmission may transmit a single data packet or multiple data packets. In one implementation, multiple data packets are bundled together and transmitted in real-time. For example, 10 or more packets may be bundled together, and one or more bundles may be transmitted outside of the enterprise network every second. In one such implementation, the delay time between receipt of a packet by a network agent (e.g., the network agent 114) and transmission of the copied, prepared packet into the communication network 120 is less than one second. In another implementation, this delay time between packet receipt and packet transmission is approximately one-tenth of a second.

In still another implementation, one or more of the network agents 114, 116, and 118 transmit the network traffic on periodic basis. For example, a network agent may transmit one or more data packets or data packet bundles into the communication network 120 every few minutes, every few hours, once per day, or manually at the option of a system administrator. In yet another implementation, a network agent is tasked with capturing data corresponding to a predetermined time period of interest. The network agent begins capturing relevant data of the time period and postpones replay of the captured data until all relevant data is captured.

In one implementation, the network agents 114, 116, and 118 replay the network traffic into the communication network 120 in-line with normal traffic flow. In an inline replay system, data processing operations may operate on original data rather than on a copy of the data. The original data can be held by the processing operations until such operations have fully executed. Consequently, problems during pre-transmission processing and/or replay (e.g., crashes) may have side effects on software of the enterprise network, such as shutting down network access. For example, systems that use proxies to send and receive out-of-network requests can disrupt normal network operations in a failure scenario. Thus, there are some advantages to a passive replay system, described below.

In another implementation, the network agents 114, 116, and 118 replay the network traffic into the communication network 120 passively. In a passive replay system, the network agents make a copy of data traffic prior to pre-transmission processing and replay. Thus, one advantage to a passive replay system is that data processing issues do not affect the originating network traffic or software of the enterprise network. Consequently, passive replay systems do not generally disrupt normal network traffic flow.

The managed security service 102 unwraps the replayed network traffic, stores a copy of the replayed network traffic (e.g., in a storage location 122), and performs additional processing on the replayed network traffic to search for and identify security threats. In one implementation, a copy of raw network traffic from an enterprise network is stored in the communication network 120. For example, the raw network traffic of the global corporate network 110 may be maintained in a storage location 122 outside the global corporate network from the time that the global corporate network 110 first enlists the services of the managed security service 102 until the time that the global corporate network 110 cancels the services of the managed security service 102. The data preserved in the storage location 122 may include full or partial raw data. Metadata may also be preserved, either alone, or in addition to associated raw data. In at least one implementation, data is replayed into the communication network 120, but no data is preserved in the communication network 120. Different classifications (i.e., types) of network traffic (e.g., domain name system (DNS) traffic, HTTP traffic, streaming media traffic, etc.) may be preserved in the communication network 120 for different durations of time.

Preserving raw traffic data in the communication network 120 may allow for retrospective threat analysis dating back weeks, months, or even years to the time of any event captured in the raw traffic data. Therefore, raw traffic data stored on the communication network 120 can be retrospectively searched for threat signatures that were not known about and/or not actively looked for in the days immediately following an event of interest.

The replayed network traffic from each enterprise network may have a high degree of data integrity. Data integrity refers to a quantity and quality of data that allows for an accurate representation of an enterprise network. The security system 100 allows for a high degree of data integrity in the replayed network traffic because storage space within the communication network 120 is very large (e.g., potentially infinite). As a consequence of this enhanced data integrity, the security system 100 can replay network traffic that includes some traffic types (e.g., media traffic, http traffic, etc.) that are routinely discarded in other security systems where data is stored and analyzed locally (e.g., internal to a local enterprise network). Additionally, data integrity of the security system 100 is enhanced by the ability of the security system 100 to dynamically adjust policies governing the types and quantities of network traffic replayed. These dynamic policy adjustments are discussed in greater detail below.

Figure 2:
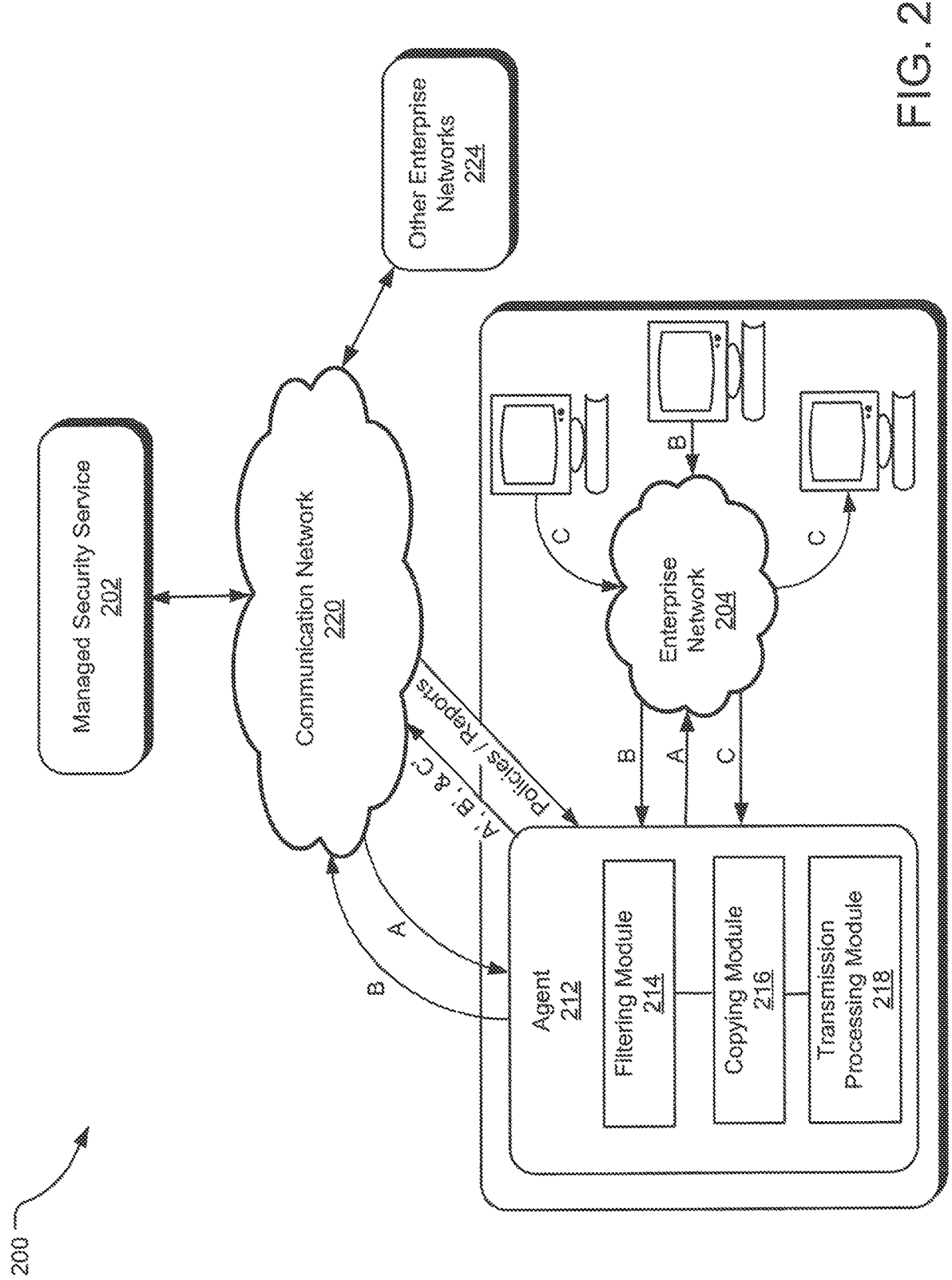
FIG. 2 illustrates an example security system including a network agent that processes and replays network traffic outside of an enterprise network.

FIG. 2 illustrates an example security system 200 including a network agent 212 that processes and replays network traffic of an enterprise network 204 to an entity (e.g., a managed security service 202) outside of the enterprise network 204. The enterprise network 204 includes a plurality of processing devices (e.g., computers) communicatively coupled to share data with one another. The network agent 212 resides locally within the enterprise network 204 (e.g., at a point of egress) and has access to network data packets sent to and/or from various communications devices within the enterprise network 204.

In one implementation, the network agent 212 is software loaded in memory of a computer connected to the enterprise network 204 by way of a wired or wireless network link on a carrier signal (e.g., Ethernet, 3G wires, 4G wireless, LTE, etc.). In another implementation, the network agent 212 is loaded into memory of a mobile device, such as a tablet or cellular phone. Other implementations may also be employed.

The network agent 212 intercepts network traffic including incoming network traffic (as indicated by a transmission line "A"), outgoing network traffic (as indicated by a transmission line "B"), and traffic transmitted between various locations within the enterprise network 204 (as indicated by a transmission line "C"). The network agent 212 utilizes various processing modules (e.g., a filtering module 214, a copying module 216, and a transmission processing module 218) to prepare a copy of the intercepted network traffic for transport out of the enterprise network. The prepared copy of the network traffic is then transmitted outside of the enterprise network (as indicated by another transmission "A', B', & C'"). The replayed network traffic is saved outside of the enterprise network 204 in a storage location accessible by the managed security service 202.

To prepare the network traffic for replay, the filtering module 214 filters (e.g., discards) some types real-time traffic while selecting other types of real-time traffic for transmission. For example, the filtering module 214 may filter out some or all types of traffic with a low security profile such as streaming media and voice over IP (VoIP).

The filtering module 214 provides the filtered network traffic to the copying module 216, and the copying module 216 makes a copy of the filtered network traffic. This copy is provided to the transmission processing module 218, which processes the filtered, copied network traffic to prepare it for transmission into the communication network 220. In at least one implementation, the copying module 216 copies the network traffic after it is processed by the transmission processing module 218.

Both the filtering module 214 and the transmission processing module 218 operate according to a number of policies (e.g., rules for filtering and processing). These policies can be specified by either the managed security service 202 or the enterprise network 204.

In one implementation, the enterprise network 204 subscribes to a security service package provided by the managed security service 202. The security service package includes a number of pre-set policies that the network agent 212 implements in replaying network traffic. In this or another implementation, the enterprise network 204 customizes the security service package by selecting one or more additional policies for implementation. The pre-set or customized policies implemented by the network agent 212 can be dynamically altered at a later point in time, such as at the option of the enterprise network 204 or the managed security service 202.

Some data-selection policies may specify data types and quantities of network traffic for replay. For example, a policy set by the managed security service 202 may set a cap on the total bandwidth of network traffic that can be replayed by the network agent 212 outside of the enterprise network 204. Another example policy instructs the network agent 212 to discard network traffic relating to media streaming (e.g., Youtube™ videos, internet radio streams, etc.) These and other additional data-selection policies can be specified by one or both of the managed security service 202 or the enterprise network 204.

Still other data-selection policies prioritize different types of network traffic for replay into the communication network 220. For example, the enterprise network 204 may specify a data-selection policy that prioritizes domain name system (DNS) traffic over streaming media traffic. If this policy is implemented, the network agent 212 replays both DNS traffic and streaming media traffic into the communication network 220 so long as the total quantity of data replayed does not exceed a data cap policy set by the managed security service 202. When network traffic increases to the point that the amount of selected network traffic exceeds the data cap, the network agent 212 begins to discard or truncate streaming media traffic while continuing to replay DNS traffic. Another example data prioritization policy prioritizes HTTP traffic over Non-HTTP traffic. Yet another example data prioritization policy prioritizes "behavioral anomaly traffic" over "normal traffic."

The transmission processing module 218 processes the filtered (i.e., selected) and copied network traffic to prepare it for transmission outside of the enterprise network. This pre-transmission processing is performed according to a number of transmission preparation policies. Like the data-selection policies, the transmission preparation policies can be specified by controlling entities (e.g., system administrators) of the enterprise network 204 and/or the managed security service 202.

One example transmission preparation policy provides instructions for collecting and assembling metadata for replay into the communication network 220. Metadata can be used to describe all network connections and thus can be used to enhance pre-transmission processing operations and supply additional information useful in subsequent, post-transmission processing and analysis performed by the managed security service 202. In one implementation, metadata is replayed into the communication network 220 with corresponding network traffic data. In another implementation, metadata is replayed into the communication network 220 without corresponding network traffic data. For example, when avoiding transfer of a streaming media session, metadata relating to the streaming media session may still be transferred, such as the computers and servers involved in the transfer and the duration and size of the transfers. Metadata may be data that is included with the original network traffic or data that is created by the transmission processing module 218 based on the original network traffic.

Another example transmission preparation policy includes instructions for compressing data and managing data compression, such as by building replay traffic data in small, compression-friendly chunks in order to maximize gains. Still other example transmission preparation policies include policies for stripping noise, de-duplicating the traffic data, and encrypting the traffic data. In at least one implementation, data is replayed into the communication network 220 unencrypted.

The network agent 212 transforms the processed network traffic into a form suitable for transport outside of the enterprise network 204 and then sends the processed network traffic 212 into the communication network 220 for further processing (e.g., unwrapping, analysis) by the managed security service 202.

Within the communication network 220, the managed security service 202 unwraps the replayed network traffic, stores a copy of the raw traffic, and also processes the replayed network traffic to search for and identify security threats. The managed security service 202 periodically reports back to the network agent 212 with results and other information relating to the processing of the replayed network traffic. The managed security service 202 may send reports the network agent 212 at regular time intervals or upon request of the enterprise network 204. Information reported back to the network agent 212 may be customized for the network agent 212 based on the policies of the network agent 212, which may be the same or different from policies of other network agents in the system 200 (e.g., network agents of other enterprise networks 224).

Security intelligence of the managed security service 202 is continuously gathered from ongoing analysis of replayed network traffic from a plurality of enterprise networks (e.g., the enterprise network 204 and other enterprise networks 224). The security intelligence collectively gained from the plurality of enterprise networks is referred to herein as "collective network intelligence." As additional threat signatures or cyber attack strategies are identified across each of the enterprise networks in the system 200, the collective network intelligence evolves. Because the managed security service 202 can, at any time, recommend or implement policies based on newly-acquired collective network intelligence, policies of the network agent 212 can be adaptively improved.

In one implementation, existing policies of the network agent 212 are dynamically altered by the managed security service 212 based on analysis of replayed traffic data from other enterprise networks 224. For example, an analysis of replayed traffic data from another enterprise network may lead to identification of one or more suspicious actions taken by a hacker prior to a security breach of the other enterprise network. Based on the identified suspicious actions, the managed security service 202 alters policies of the network agent 212 for data selection and/or pre-transmission processing. The altered policies help to ensure that the same suspicious actions, if repeated on the enterprise network 204, do not evade detection of the managed security system 202.

In the same or another implementation, policies are recommended to the network agent 212 by the managed security service 202 based on analysis of replayed traffic data from one or more other enterprise networks 224. For example, the managed security system 202 may detect a threat signature in type "A" network traffic that is observed on another one of the other enterprise networks 224. Thereafter, the managed security service 202 may recommend that the network agent 212 alter an existing data-selection priority policy to ensure that type "A" traffic of the enterprise network 204 is captured in the future.

This type of dynamic policy-alteration and/or intelligent policy recommendation may be especially useful in the context of different security plans subscribed to by various enterprise networks. For example, the enterprise network 204 may be a small business network that subscribes to a low-cost security package allotted less storage capacity than another high-end security package subscribed to by a multinational corporation. The low-cost security package of the small business may routinely discard some or all type 'A' network traffic. However, after detecting suspicious activity in type 'A' network traffic on the network of the multinational corporation, the managed security service 202 can recommend that the network agent 212 adopt a selection policy that increases the priority of capturing type 'A' network traffic. Thus, it becomes more likely that the managed security service 202 may detect suspicious activity that occurs in type 'A' network traffic on the enterprise network 204.

The network agent 212 may be capable of taking one or more remediative actions in response to an alert or policy recommendation from the managed security service 202. In one implementation, the network agent 212 can elect to take different remediative actions based on a severity of an identified threat. For example, the network agent 212 or the managed security service 202 may classify threats as "low-level," "medium-level," and "high-level." Depending on the level of the identified threat, the network agent 212 may take a different remediative action.

In one implementation, the managed security service 202 alerts the network agent 212 of a low-level threat and the network agent 212 requests that a controlling entity of the enterprise network 204 authorize implementation of a new policy. In another implementation, the managed security service 202 alerts the network agent 212 of a medium-level threat and the network agent 212 automatically implements one or more new policies without requesting authorization. In yet another implementation, the managed security service 202 alerts the network agent 212 of a high-level threat and the network agent 212 automatically resets a transmission control protocol (TCP) or quarantines one or more devices on the enterprise network 204.

In yet another implementation, the network agent 212 is integrated with on-premise firewalls and can instruct the on-premise firewalls to enforce policy. For example, the managed security service 202 may issue a TCP reset and communicate with the network agent 212 an instruction to disallow a certain type of traffic through the on-premise firewalls. The network agent 212 can then relay this instruction to the on-premise firewalls via an API call.

In still yet another implementation, the network agent 212 is integrated with on-premise advanced malware solutions to trigger specialized behavior of the malware solutions. For example, the network agent 212 may send a suspicious file to a network security appliance for further analysis.

Figure 3:
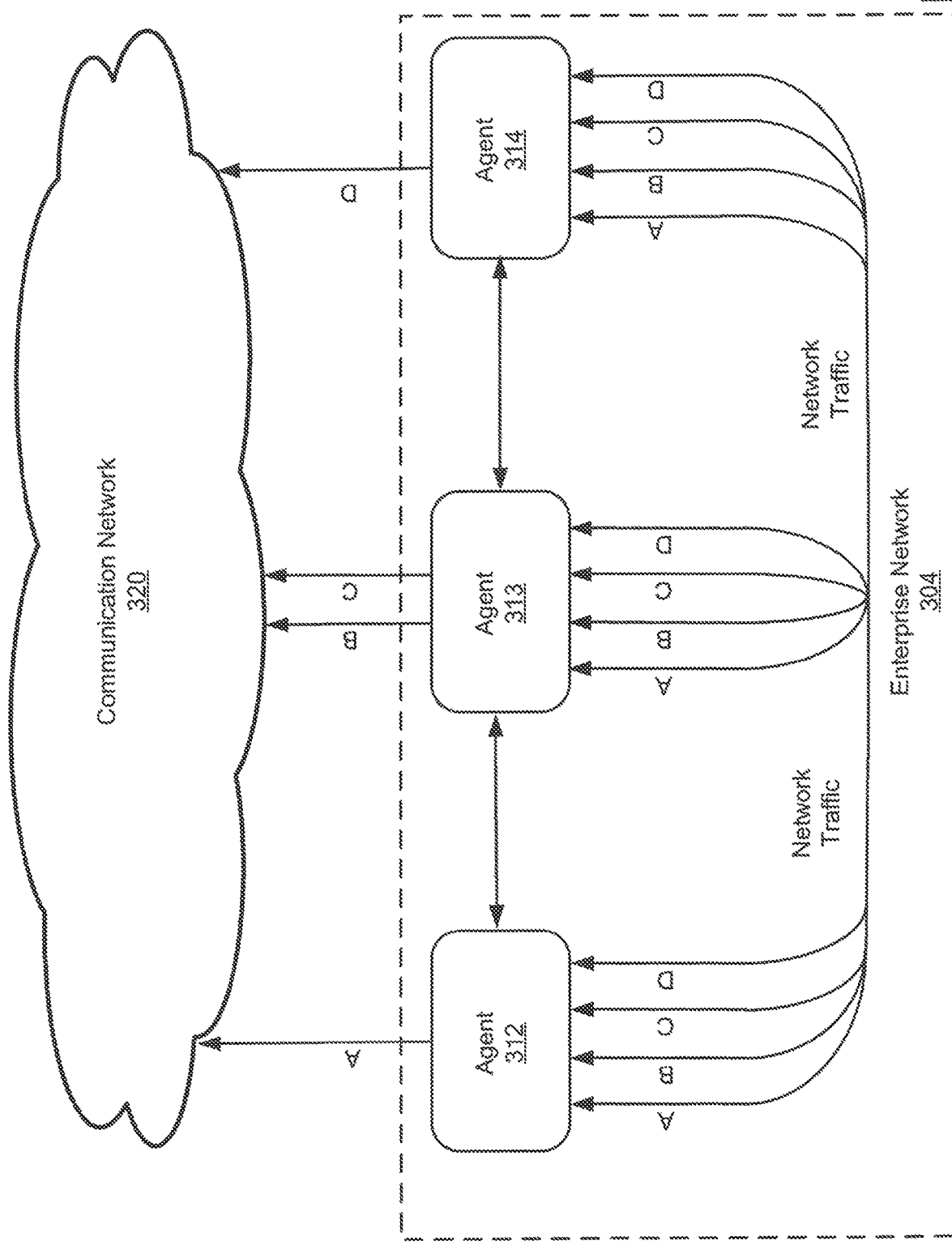
FIG. 3 illustrates another example security system including multiple network agents working in concert to replay network traffic of an enterprise network outside of the enterprise network.

FIG. 3 illustrates another example security system 300 including an enterprise network 304 and multiple network agents 312, 313, and 314 working in concert to replay network traffic outside of the enterprise network 304. Each of the network agents 312, 313, and 314 resides locally, at a point of egress, on the enterprise network 304. In one implementation, each of the network agents 312, 313, and 314 are located at different physical facilities that share data over the enterprise network 304.

The network agents 312, 313, and 314 each have access to network data packets sent to and from various communications devices on the enterprise network 304. Each of the network agents 312, 313, and 314 may have a filtering module, copying module, and a transmission processing module. These modules may perform the same or similar functions to those functions described with respect to FIG. 2.

The network agents 312, 313, and 314 communicate back and forth to coordinate policy implementation. In particular, the network agents 312, 313, and 314 can communicate to divide up one or more transmission processing and replay tasks. For example, one replay task illustrated by FIG. 3 entails execution of a policy that instructs the network agents 312, 313, and 314 to replay all network traffic of types A, B, C, and D into the communication network 320. The network agents 312, 313, and 314 communicate to divide up transmission processing and replay tasks among themselves. In FIG. 3, the network agent 312 replays network traffic of Type A; the network agent 313 replays network traffic of Type B and C; and the network agent 314 replays network traffic of type D. Each agent filters or ignores network traffic that is designated for replay by another one of the network agents. Inter-agent communication may be accomplished by way of dynamic peer-to-peer communication through a proprietary protocol and/or by way of policy, such as one or more customer-specified policies.

Figure 4:
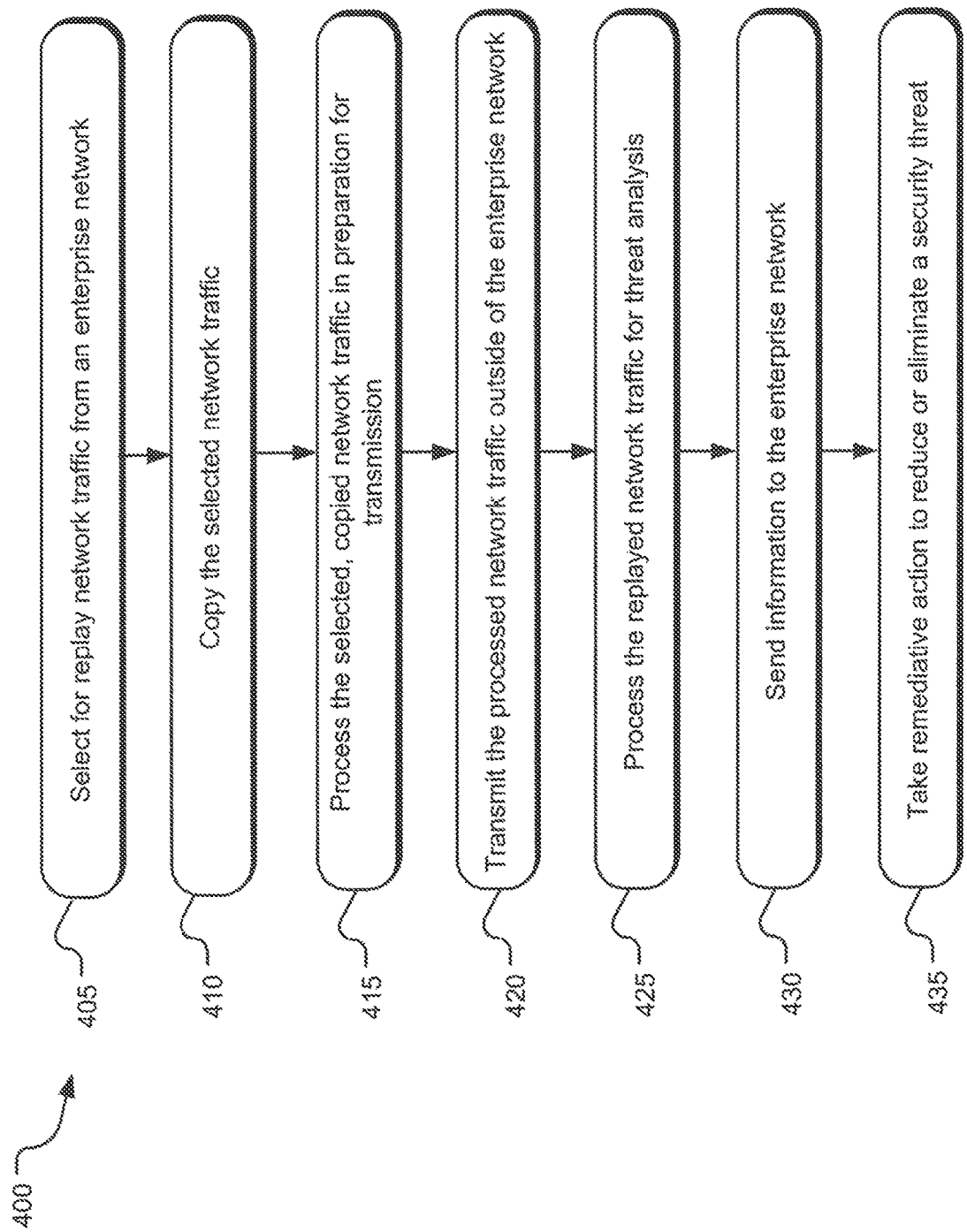
FIG. 4 illustrates example operations for replaying network traffic outside of an enterprise network.

FIG. 4 illustrates example operations performed by a network agent on an enterprise network to replay network traffic outside of the enterprise network.

A selection operation 405 selects for replay a subset of network traffic on an enterprise network. The subset of network traffic is selected based on a number of data-selection policies which may, for example, specify or prioritize types of network traffic or set one or more data caps on the amount of network traffic that is to be replayed. The data selection policies can be specified by either the enterprise network and/or a third party entity outside of the enterprise network. In one implementation, the third party entity outside of the enterprise network is a managed security service that provides security threat analysis and detection services to the enterprise network.

The selection operation 405 may also filter certain types of network traffic based on criteria such as data type (e.g., media-streaming traffic), traffic prioritization policies, data capping policies, etc.

A copying operation 410 makes a copy of the selected network traffic. Subsequent processing operations operate on the copy of the selected network traffic rather than on the original data. In some implementations, data replay is inline rather than passive, and the copying operation 410 is not performed.

A processing operation 415 processes the selected network traffic for to prepare the network for transmission. This processing is performed according to a number of transmission preparation policies Like the data-selection policies, the transmission preparation policies can be specified by either the enterprise network or a third-party entity outside of the enterprise network. The transmission preparation policies may include without limitation policies relating to the following: noise-stripping, data de-duplication, metadata creation, data compression, and data encryption.

A replay operation 420 replays the processed network traffic outside of the enterprise network, such as into a computing network not controlled by the security net of the enterprise network. Another processing operation 425 processes the transmitted network traffic outside of the enterprise network. Processing may include a number of operations including without limitation: unwrapping the replayed network traffic; storing a copy of the raw network traffic; and/or performing analysis on the replayed network traffic. The processing operation 425 may be performed based on collective network intelligence that is gained from processing replayed network traffic of one or more other network enterprises.

A sending operation 430 sends information to the network enterprise responsive to the processing operation 425. In one implementation, the sending operation 430 sends a request to add a new data-selection or transmission preparation policy. In the same or another implementation, the sending operation 430 sends the request responsive to another processing operation that processes replayed network traffic from another network enterprise. For example, real-time processing of replayed network traffic from another network enterprise may guide selection of the new policy request. The new policy request is implemented automatically (such as by the selection operation 405 or the transmission processing operation 415) or at the option of an administrator of the enterprise network.

In another implementation, the sending operation 430 sends a request to alter an existing data-selection or data transmission preparation policy. The request may be sent responsive to another processing operation (i.e., a processing operation different from the processing operation 425) that processes replayed network traffic from one or more different network enterprises. The requested policy alteration can be implemented automatically (such as by the selection operation 410 or the transmission processing operation 415) or at the option of an administrator of the enterprise network.

In yet another implementation, the sending operation 430 sends a report to the enterprise network that summarizes results of the processing operation 425.

A remediation operation 435 takes a remediative action responsive to the sending operation 430. In one implementation, the remediative action taken may vary based on a "threat-classification level" included in or associated with the information sent by the sending operation 430. In at least one implementation, the remediation operation 435 is not performed.

FIG. 5 discloses a block diagram of a computer system 500 suitable for implementing one or more aspects of a security system that provides for network traffic replay outside of an enterprise network. The computer system 500 is capable of executing a computer program product embodied in a tangible computer-readable storage medium to execute a computer process. Data and program files may be input to the computer system 500, which reads the files and executes the programs therein using one or more processors. Some of the elements of a computer system 500 are shown in FIG. 5 wherein a processor 502 is shown having an input/output (I/O) section 504, a Central Processing Unit (CPU) 506, and a memory section 508. There may be one or more processors 502, such that the processor 502 of the computing system 500 comprises a single central-processing unit 506, or a plurality of processing units. The processors may be single core or multi-core processors. The computing system 500 may be a conventional computer, a distributed computer, or any other type of computer. The described technology is optionally implemented in software loaded in memory 508, a disc storage unit 512, and/or communicated via a wired or wireless network link 514 on a carrier signal (e.g., Ethernet, 3G wireless, 5G wireless, LTE (Long Term Evolution)) thereby transforming the computing system 500 in FIG. 5 to a special purpose machine for implementing the described operations.

The I/O section 504 may be connected to one or more user-interface devices (e.g., a keyboard, a touch-screen display unit 518, etc.) or a disc storage unit 512. Computer program products containing mechanisms to effectuate the systems and methods in accordance with the described technology may reside in the memory section 504 or on the storage unit 512 of such a system 500.

A communication interface 524 is capable of connecting the computer system 500 to an enterprise network via the network link 514, through which the computer system can receive instructions and data embodied in a carrier wave. When used in a local area networking (LAN) environment, the computing system 500 is connected (by wired connection or wirelessly) to a local network through the communication interface 524, which is one type of communications device. When used in a wide-area-networking (WAN) environment, the computing system 500 typically includes a modem, a network adapter, or any other type of communications device for establishing communications over the wide area network. In a networked environment, program modules depicted relative to the computing system 500 or portions thereof, may be stored in a remote memory storage device. It is appreciated that the network connections shown are examples of communications devices for and other means of establishing a communications link between the computers may be used.

In an example implementation, a network agent of an enterprise network may be embodied by instructions stored in memory 508 and/or the storage unit 512 and executed by the processor 502. Further, local computing systems, remote data sources and/or services, and other associated logic represent firmware, hardware, and/or software, which may be configured to replay network traffic outside of the enterprise network. The network agent of the enterprise network may be implemented using a general purpose computer and specialized software (such as a server executing service software), a special purpose computing system and specialized software (such as a mobile device or network appliance executing service software), or other computing configurations. In addition, data-selection policies and data transmission preparation policies may be stored in the memory 508 and/or the storage unit 512 and executed by the processor 502.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. One or more non-transitory computer-readable storage media storing computer-executable instructions for execution by at least one processor for threat detection for an enterprise network, wherein the instructions cause the at least one processor to perform a computer process comprising:
   intercepting a network traffic stream of the enterprise network directed to a target destination;
   copying data packets of the network traffic stream within the intercepted network traffic stream;
   replaying the copied packets to an end destination outside of the enterprise network and other than the target destination;
   analyzing the copied and replayed packets to determine whether the copied and replayed packets include a potential security threat to the enterprise network; and
   taking a remedial action based on an identified threat level associated with the potential security threat,
   wherein replaying the copied packets to the end destination further comprises:
   during a period of time that the network traffic stream is intercepted, continuously bundling groups of the packets, each bundle created responsive to receipt of a predetermined quantity of the packets, and
   replaying each one of the bundled groups of the packets to the end destination.

2. The one or more non-transitory computer-readable storage media of claim 1, wherein the computer process further comprises:
   responsive to receipt of a predetermined number of packets of the network traffic stream, bundling the predetermined number of packets for the replay operation.

3. The one or more non-transitory computer-readable storage media of claim 1, wherein the computer process further comprises:
   replaying at least one packet per transmission at a rate of at least one transmission per second during a time period that the network traffic stream is intercepted.

4. The one or more non-transitory computer-readable storage media of claim 1, wherein the replay operation further comprises:
   replaying the packets in real-time as the packets are copied.

5. The one or more non-transitory computer-readable storage media of claim 1, wherein the analyzing is a retrospective threat analysis.

6. The one or more non-transitory computer-readable storage media of claim 1, wherein the enterprise network is a network interconnecting various devices controlled by security policies of an enterprise.

7. The one or more non-transitory computer-readable storage media of claim 1, wherein the intercepting and copying of the network traffic occurs within a communication channel of the enterprise network.

8. The one or more non-transitory computer-readable storage media of claim 1, wherein the computer process further comprises:

selecting the network traffic for replay based on policies specified by an entity external to the enterprise network.

9. The one or more non-transitory computer-readable storage media of claim 1, wherein the computer process further comprises:
processing the network traffic based on policies specified by an entity external to the enterprise network.

10. The one or more non-transitory computer-readable storage media of claim 1, wherein the computer process further comprises:
adaptively altering a data selection policy based on collective network intelligence of a third-party security service external to the enterprise network.

11. The one or more non-transitory computer-readable storage media of claim 1, wherein the computer process further comprises:
adaptively altering a data transmission preparation policy based on collective network intelligence of a third-party security service.

12. The one or more non-transitory computer-readable storage media of claim 1, wherein taking the remedial action further comprises:
taking the remedial action responsive to a notification based on collective network intelligence of a security service external to the enterprise network.

13. The one or more non-transitory computer-readable storage media of claim 1, wherein the computer process further comprises:
transmitting a communication to a first agent of the enterprise network, the communication instructing the first agent to perform a first part of a replay task; and
performing, at a second agent of the enterprise network, a different part of the replay task.

14. A system comprising:
at least one processor configured to execute a network agent stored in at least one memory to:
intercept a network traffic stream of an enterprise network directed to a target destination;
copy data packets of the network traffic stream;
replay the copied packets to end destination outside of the enterprise network and other than the target destination; and
at least one processor configured to execute a security management module to:
analyze the copied, replayed packets to assess whether one or more of the copied, replayed packets includes a potential security threat to the enterprise network, and
provide a notification to the network agent identifying a threat level associated with the potential security threat; and
wherein the network agent is further configured to:
bundle a predetermined number of packets for the replay operation responsive to receipt of the predetermined number of packets;
receive the notification; and
perform a remedial action based on the identified threat level.

15. The system of claim 14, wherein when bundling a predetermined number of packets, the network agent is further configured to:
continuously bundle groups of the packets during a period of time that the network traffic stream is intercepted, each bundle created responsive to receipt of a predetermined quantity of the packets; and
wherein the network agent is further configured to:
replay each one of the bundled groups of the packets to the end destination.

16. The system of claim 14, wherein the network agent is further configured to replay the copied packets in individual transmissions that each include at least one of the packets and wherein the transmissions are sent at a rate of at least one transmission per second.

17. The system of claim 14, wherein the network agent is further configured to replay the packets in real-time as the packets are copied.

18. The system of claim 14, wherein the network agent is configured to replay a filtered subset of all network traffic on the enterprise network.

19. The system of claim 14, wherein the network agent selects packets for the replay based on policies specified by an entity external to the enterprise network.

20. The system of claim 14, wherein the network agent processes the network traffic based on policies specified by an entity external to the enterprise network.

21. The system of claim 14, further comprising:
a managed security service external to the enterprise network, the managed security service configured to adaptively alter a data selection policy of the network agent based on collective network intelligence.

22. The system of claim 14, wherein the notification is based on collective network intelligence of a security service external to the enterprise network.

23. The system of claim 14, wherein the network agent is configured to perform a first part of a replay task and transmit a communication instructing another network agent to perform a second part of the replay task.

24. The system of claim 14, wherein the network agent replays a bundle of data packets within one second of receiving the data packets.

* * * * *